(12) United States Patent
Veidenbaum et al.

(10) Patent No.: US 7,464,253 B2
(45) Date of Patent: Dec. 9, 2008

(54) TRACKING MULTIPLE DEPENDENT INSTRUCTIONS WITH INSTRUCTION QUEUE POINTER MAPPING TABLE LINKED TO A MULTIPLE WAKEUP TABLE BY A POINTER

(75) Inventors: Alexander V. Veidenbaum, Irvine, CA (US); Marco Antonio Ramirez Salinas, Barcelona (ES); Adrian Cristal Kestelman, Barcelona (ES); Mateo Valero Cortes, Barcelona (ES)

(73) Assignee: The Regents of the University of California, Oakland, CA (US)

( * ) Notice: Subject to any disclaimer, the term of this patent is extended or adjusted under 35 U.S.C. 154(b) by 10 days.

(21) Appl. No.: 11/538,016

(22) Filed: Oct. 2, 2006

(65) Prior Publication Data

US 2008/0082788 A1 Apr. 3, 2008

(51) Int. Cl.
*G06F 9/30* (2006.01)
(52) U.S. Cl. ....................... 712/216; 712/214
(58) Field of Classification Search .................. None
See application file for complete search history.

(56) References Cited

U.S. PATENT DOCUMENTS 5,655,096 A * 8/1997 Branigin .................... 712/200
6,065,105 A * 5/2000 Zaidi et al. ................... 712/23
6,557,095 B1 4/2003 Henstrom ................... 712/216
6,889,314 B2 * 5/2005 Samra et al. ................ 712/216
7,130,990 B2 * 10/2006 Brekelbaum et al. ........ 712/214

OTHER PUBLICATIONS

D. Folegnani and A. González, "Energy Effective Issue Logic", Procs. 28th Intl. Symposium on Computer Architecture, 2001. pp. 230-239.

* cited by examiner

*Primary Examiner*—Kenneth S Kim
(74) *Attorney, Agent, or Firm*—Shimokaji and Associates, P.C.

(57) ABSTRACT

A method and apparatus for improving the operation of an out-of order computer processor by utilizing and managing instruction wakeup using pointers with an instruction queue payload random-access memory, a mapping table, and a multiple wake-up table. Instructions allocated to the instruction queue are identified by association with a physical destination register used to index in the mapping table to provide dependent instruction information for instruction wakeup for scalable instruction queue design, reduced power consumption, and fast branch mis-prediction recovery, without the use of content-addressable memory cells.

19 Claims, 6 Drawing Sheets

TRACKING MULTIPLE DEPENDENT INSTRUCTIONS WITH INSTRUCTION QUEUE POINTER MAPPING TABLE LINKED TO A MULTIPLE WAKEUP TABLE BY A POINTER

GOVERNMENT RIGHTS

This invention was made with government support under grant number CCRO311738 awarded by the National Science Foundation. The government has certain rights in the invention.

BACKGROUND OF THE INVENTION

The present invention generally relates to computer systems and, more specifically, to a pointer-based instruction queue design for out-of-order processors.

As best understood by one skilled in the art, instructions in a conventional computing system processor are executed in a program order. In addition, only after an instruction has computed a new value into a destination register is the new value available for use by subsequent instructions. Instructions generally function by using operands produced by previous instructions, because the dependent, subsequent instruction cannot execute until one or more requisite source operands become available.

Designers of computing systems are continually developing techniques to improve processor performance and throughput. One such technique, commonly referred to as "out-of-order execution" or "out-of-order processing," operates by issuing instructions out of program order, as their corresponding source operands become available. The relationships of dependent instructions to previous instructions determine the sequence in which the relevant instructions are to be executed. Generally, a predetermined number of such instructions are scheduled for execution in parallel: (i) during the same clock cycle, and (ii) as soon as corresponding source data dependencies can be resolved. Out-of-order processing serves to increase execution speed of the processor, in particular, and of the computing system overall.

The processor component central to out-of-order processing is the Instruction Queue, or Issue Queue (IQ). Instructions are entered, or allocated, into the Issue Queue in program order for transmittal to respective execution units when corresponding operands become available. Allocation is the process of writing the necessary information into the Issue Queue RAM memory. Wakeup logic and select logic determine when allocated instructions are to be issued to the execution units. The wakeup logic is responsible for detecting when an instruction operand is ready. An instruction is marked 'ready' (RDY) when all of its operands are available. The select logic chooses for execution a subset of instructions marked RDY by the wakeup logic In the present state of the art, two types of instruction wakeup logic are most commonly used in out-of-order processors: a dependency-matrix based Issue Queue configuration and an Issue Queue configuration based on content addressable memory (CAM), also referred to as a CAM-based Issue Queue. For example, U.S. Pat. No. 6,557,095 "Scheduling operations using a dependency matrix," issued to Henstrom, discloses a method and apparatus for using a dependency matrix and for scheduling operations in order using the dependency matrix. Entries corresponding to dependent instructions are placed in a scheduling queue where a particular dependent instruction is compared with other entries in the scheduling queue. The result of the comparison is stored in the dependency matrix, where entries in the scheduling queue are subsequently scheduled based on the information in the dependency matrix. A dependency-matrix configuration, however, is not scalable.

A CAM-based Issue Queue 10, in accordance with the present art, is shown in FIG. 1. The Issue Queue 10 includes wakeup logic for two source operands and an SRAM-based payload RAM 11. During operation of the Issue Queue 10, the associated out-of-order processor (not shown) decodes, renames, and inserts an instruction in the Issue Queue 10. The processor also checks if the source register operands are ready and may set up CAM source register tags and Ready flags for each source operand in the Issue Queue 10. Each completing (or selected) instruction broadcasts its destination register tag to the Issue Queue CAMs 15 and 17, in which CAMs set individual operand Ready (Op_Rdy) flags 25 and 27 on a tag match. An Instruction Ready flag may be set when both of its source operands are ready.

In the CAM configuration shown, here configured for a 4-wide issue processor, register numbers may be input into a payload RAM 11 and into CAMs of the Issue Queue 10 via a set of four input multiplexers 13. The destination register number for each instruction that is completing execution is replicated four times and broadcast through an Issue Queue CAM 22. The CAM 22 may include a first field 15, here designated as 'Op1,' and a second field 17, here designated as 'Op2,' for storage of the register number of the first and second operands, respectively, required by an instruction. For example, if the corresponding Issue Queue instruction reads "add the contents of register 1 and the contents of register 2, and place the result in register 3," then the first field 15 will contain register number 1 and the second field 17 will contain register number 3. The destination register number 3 would also appear in a payload RAM 19, here designated as 'DEST.'

A column 21 in the payload RAM 11, here denoted as 'FREE', may indicate whether or not a corresponding entry is being used. It is known in the relevant art to disable an unused entry to save power in the computing system. An allocation logic module 23 is used to identify an available entry when an instruction is being written. A flag entry in the first flag column 25 (Op1Rdy) or the second flag column 27 (Op2Rdy) may be used to indicate whether the corresponding operand has already been 'seen,' that is, when a successful CAM comparison has been made.

The flag may also be set when an instruction is first entered into the Issue Queue 10 if the corresponding source operand has already been computed. When both flags have been set, an 'instruction ready' signal 29 may be sent to a selection logic module 31. The selection logic module 31 may choose to send the corresponding pending instruction 39 to execution via a set of control lines 33 communicating with, in this particular example, a set of four output multiplexers 35. When the corresponding instruction is ready, the values of the first field 15, the second field 17, and other payload RAM fields 24 may be used in subsequent pipelined stages.

A 1-bit CAM cell circuit 40 with four 'write' ports and six 'comparison' ports is shown in FIG. 2. The CAM cell circuit 40, which comprises a portion of the Issue Queue 10, includes a memory cell 41, and a set of four write lines 51-57, here denoted as $WL_0$ through $WL_3$, for controlling writing into the memory cell 41 upon entry allocation. A set of six comparison lines 59-69, here denoted as $ML_0$ through $ML_5$, may be used to indicate whether corresponding comparators succeeded or failed to make a match with the broadcast information provided on broadcast lines 71, 73; 75, 77, 79, and 81, here denoted as Tag-bn0, Tag-bn1, Tag-bn2, Tag-bn3, Tag-bn4 and Tag-bn5 respectively, and on corresponding complement broadcast lines 72, 74, 76, 78, 80, and 82. A latch 91, corresponding to either the first flag in column 25 or the second flag in column 27, in FIG. 1, may be set to indicate that a tag match occurred and the corresponding source operand is ready.

Because a relatively large number of active electronic devices are required for operation of the typical CAM cell circuit shown in FIG. 2, this configuration suffers from the shortcoming that the issue logic component of the Issue Queue 10 may consume as much as 25% of the central processing unit power, resulting in relatively inefficient use of power. See, for example D. Folegnani and A. González, "*Energy Effective Issue Logic*", Procs. 28$^{th}$ Intl. Symposium on Computer Architecture, 2001. pp. 230-239. Moreover, CAM configurations, such as that shown in FIG. 1, are also not scalable with respect to instruction queue size and issue width.

As can be appreciated, there is a need for an improved apparatus and method for storing and detecting readiness of instructions for execution in an out-of-order processor, where the apparatus is scalable and provides for more efficient power consumption.

SUMMARY OF THE INVENTION

In one aspect of the present invention, a direct wakeup pointer-based instruction queue organization comprises: an instruction queue payload RAM for storing instructions for execution by an out-of-order processor; a wakeup logic for tracking source operand availability for the instructions; and a mapping table for providing dependence information on the instructions to the wakeup logic, the mapping table including at least one pointer pointing to a dependent instruction in the instruction queue payload RAM.

In another aspect of the present invention, a method for selecting instructions for issuance in an out-of-order processor comprises: adding a first instruction to an instruction queue payload RAM and a mapping table; updating a first pointer in a mapping table entry, the first pointer pointing to a first dependent instruction entry in the instruction queue payload RAM, the first dependent instruction related to the first instruction; if a second dependent instruction is related to the first instruction, setting a second pointer in the mapping table, the second pointer pointing to a dependent instruction vector entry allocated in a multiple wake-up table for at least the second dependent instruction, the vector being large enough to describe all related dependent instructions; and selecting the first instruction for issuance if a ready counter in a ready counter update logic acquires a value of zero, where the ready counter value corresponds to the first instruction.

In yet another aspect of the present invention, a method for storing and issuing instructions for execution in an out-of-order processor comprises: issuing a first instruction from an instruction queue payload RAM, the first instruction having an entry in a mapping table, the entry including a status bit value, the mapping table further including a first pointer pointing to a first dependent instruction entry and a second pointer pointing to additional dependent instruction entries in the instruction queue payload RAM, all the dependent instructions processed by the mapping table when the first instruction is issued; check-pointing status bits value for the status bits for the first instruction at a branch instruction; detecting a branch mis-prediction in the first instruction; cancelling instructions allocated beyond the branch instruction and resetting corresponding free bits in the instruction queue payload RAM; restoring the status bits by using the check-pointed status bits value; and updating all dependent instruction information by removing pointers for all cancelled instructions.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, the present invention provides a direct-wakeup pointer-based instruction queue organization comprising a mapping table and a multiple wake-up table, a configuration that serves to increase the scalability and reduce power consumption in out-of-order instruction queue organizations, in comparison to conventional organizations. The mapping table and the multiple wake-up table both store pointers for instructions referred to herein as "dependent" instructions, or dependents, where a dependent instruction is an instruction that uses as source operands the value produced by a previously-executed instruction. The mapping table may also contain a pointer to the multiple wakeup table entry.

Historically, a pointer-based wakeup configuration for an out-of-order processor architecture has not found an efficient implementation as related problems of multiple dependents and branch mis-prediction recovery were not addressed. The disclosed method and apparatus of the present invention solves the problem of multiple dependents by using a small number of full dependency vectors to essentially eliminate stalls for instructions with multiple successors while requiring fewer resources than a conventional full dependency matrix. In addition, unlike conventional instruction queue organizations, CAMs are not used at all in the disclosed apparatus of the present invention, thus saving power and improving scalability.

The disclosed method and apparatus of the present invention also address problem of mis-prediction by providing for correct recovery of dependent pointers on branch mis-prediction. This is accomplished by, for example, check-pointing small amounts of additional information on each conditional branch using a destination physical register tag as a unique identifier of an instruction. The disclosed process of check-pointing may also be applicable to value prediction, or for architectures without a re-order buffer, such as Check-point Repair and Continual Flow pipeline.

Figure 1:
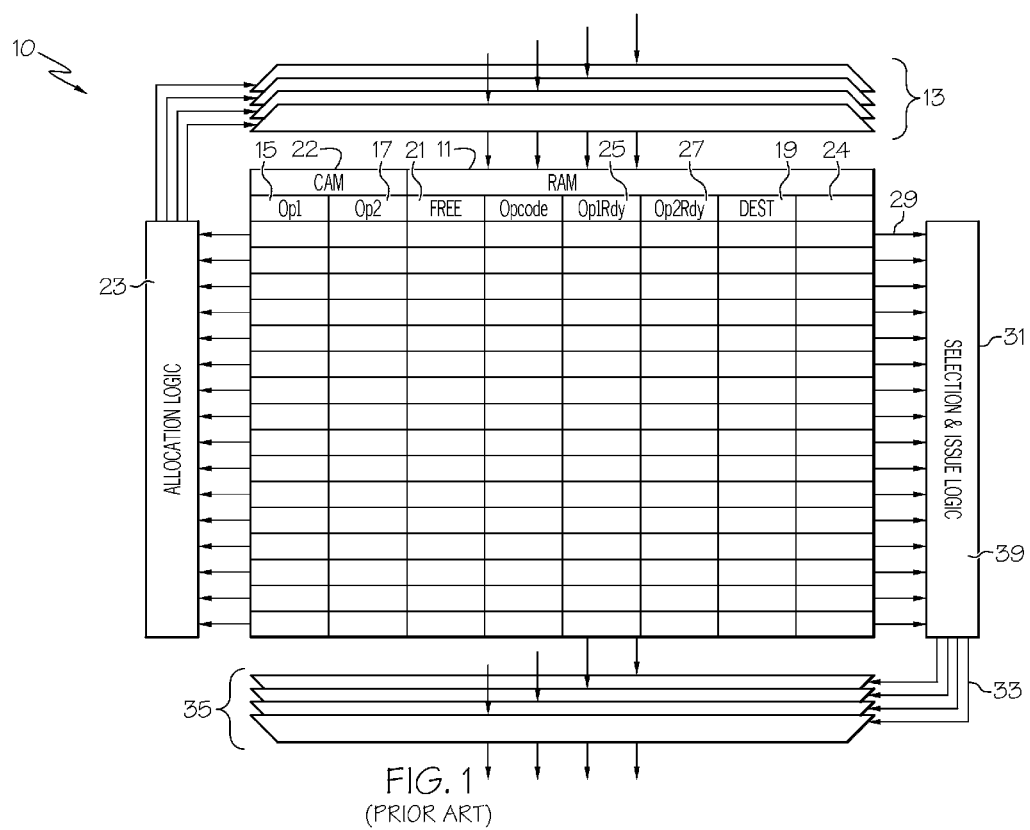
FIG. 1 is a diagram of a CAM-based Issue Queue, according to the prior art.
Figure 2:
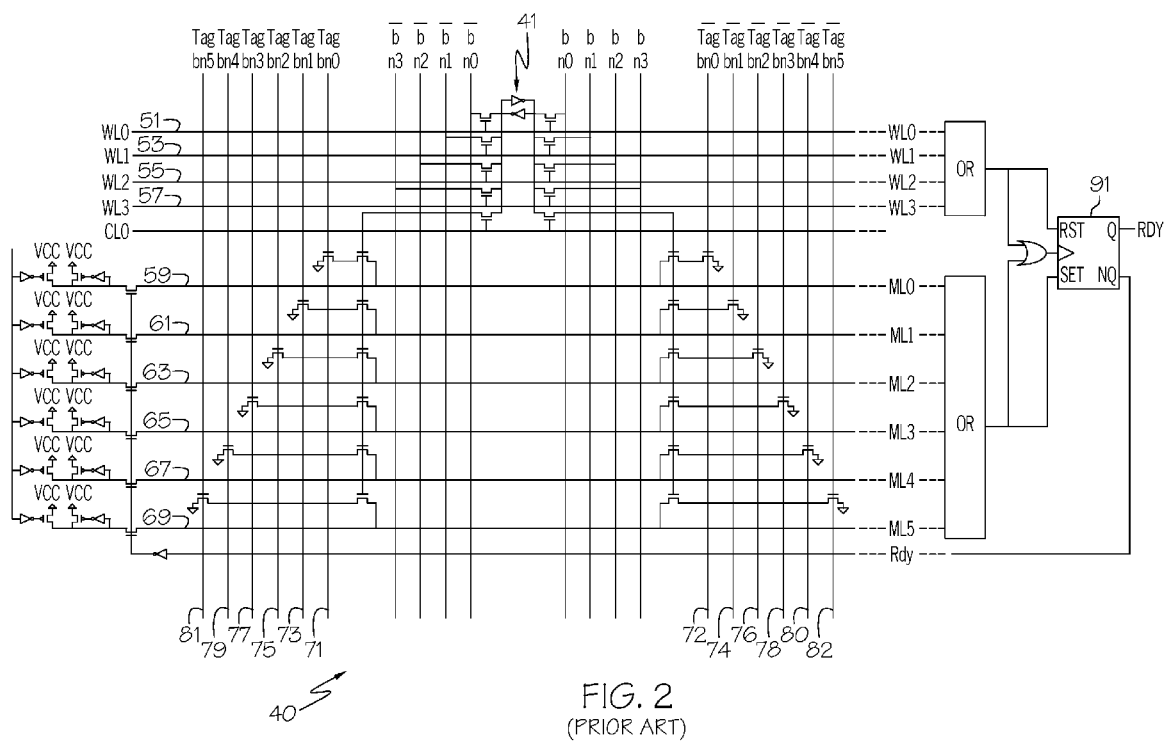
FIG. 2 is a diagram of CAM module for the CAM-based Issue Queue of FIG. 1, according to the prior art.
Figure 3:
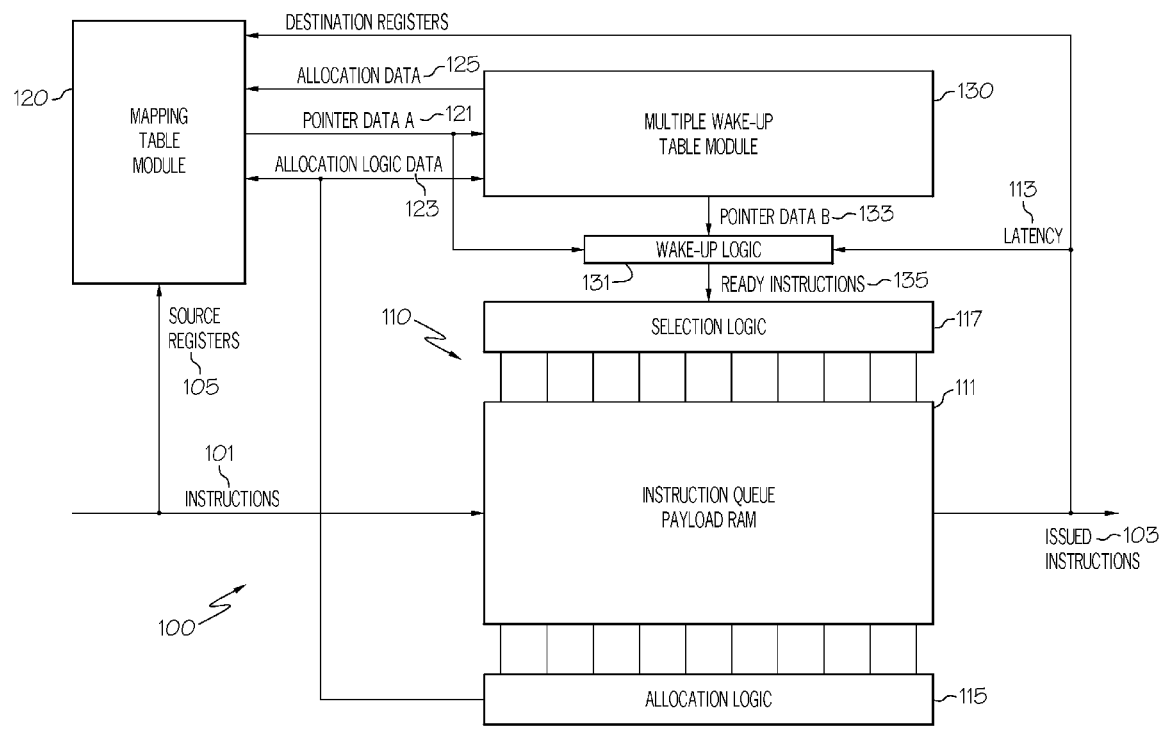
FIG. 3 is a generalized functional diagrammatical representation of a direct-wakeup pointer-based instruction queue organization, in accordance with the present invention.

There is shown in FIG. 3 a generalized functional diagrammatical representation of a direct-wakeup pointer-based instruction queue organization 100. The pointer-based instruction queue organization 100 may comprise an Instruction Queue (IQ) module 110, a Mapping Table (MT) module 120, and a Multiple Wake-up Table (MWT) module 130. In an exemplary embodiment, the Mapping Table module 120 and the Multiple Wake-up Table module 130 may comprise static random access memories (SRAMs) and may function to store information related to dependent instructions, as described in greater detail below.

Instructions 101 to be queued for execution may be written to an instruction queue payload RAM 111 in the Instruction Queue module 110 under control of an allocation logic 115. The location of the instructions 101 in the instruction queue payload RAM 111, here denoted as allocation logic data 123, may be provided to the Mapping Table module 120 and to the Multiple Wake-up Table module 130. The Mapping Table module 120 may contain instruction pointers for each dependent, or successor, instruction that uses source operands produced by other instructions, as explained in greater detail below.

An entry in the Mapping Table module 120 may include a first pointer pointing to a first dependent instruction in the Instruction Queue Payload RAM 111, and may include a second pointer pointing to an entry of the Multiple Wake-up Table module 130, which stores additional dependent instruction pointers. This information may be added to the Mapping Table module 120 as each new instruction 101 is allocated into the instruction queue payload RAM 111 for subsequent transmittal as an issued instruction 103.

As can be appreciated by one skilled in the relevant art, an instruction may be uniquely identified by association with a destination physical register. Source register data 105 may be provided to the Mapping Table module 120 as the instructions 101 are stored in the instruction queue payload RAM 111. The Multiple Wake-up Table module 130 may also contain dependent instruction pointers, if more pointers in addition to those stored in the Mapping Table module 120 are needed, as explained in greater detail below. The Multiple Wake-up Table module 130 may provide allocation data 125 to the Mapping Table module 120.

Pointer data A 121, originating in the Mapping Table module 120, may be provided to the Multiple Wake-up Table module 130, and may also be provided directly to the Wakeup logic 131 via the Multiple Wake-up Table module 130. Pointer data B 133, originating in the Multiple Wake-up Table module 130, may be provided to the Wakeup logic 131. The Wakeup logic 131 may provide 'Ready' instructions 135 to the selection logic 117, as shown. Latency counters (not shown) may be used to provide a Latency 113 indication to the wake-up logic 131 if a selected instruction has a latency longer than one clock cycle.

Figure 4:
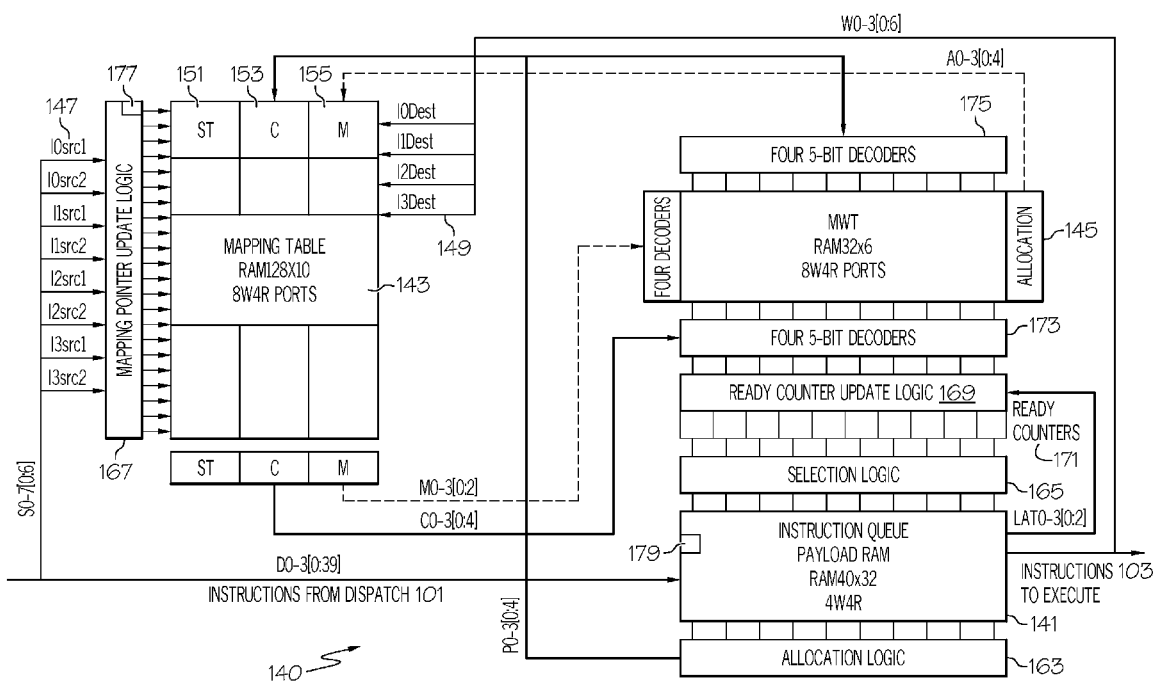
FIG. 4 is a functional diagrammatical representation of an exemplary embodiment of the direct-wakeup pointer-based instruction queue organization of FIG. 3 as may be adapted to an apparatus operating with a 4-wide issue processor, in accordance with the present invention.

An exemplary embodiment of the pointer-based instruction queue organization 100 of FIG. 3 is shown in FIG. 4. A direct-wakeup pointer-based instruction queue organization 140 may be adapted to operating with a 4-wide issue processor (not shown), where the processor architecture may be similar to an Alpha 21264 processor architecture available from the Hewlett-Packard Corporation, for example. The pointer-based instruction queue organization 140 may further comprise an instruction queue payload RAM 141 having thirty-two 40-bit entries for inputting instructions 101 and outputting selected instructions 103 for execution. The pointer-based instruction queue organization 140 may also comprise a mapping table (MP) 143 and a multiple wake-up table (MWT) 145 to store instruction dependency information. If the out-of-order processor operates with an issue width of 'N,' the mapping table 142 may include N read ports and 2×N write ports.

The instruction queue payload RAM 141 may store information necessary to execute an instruction, including: a functional unit/opcode; a source-0 physical register designator; a source-1 physical register designator; a destination physical register designator used after a wakeup-select cycle, operation latency information; and flag bits, as explained in greater detail below. The instruction queue payload RAM 141, the mapping table 143, and the multiple wake-up table 145 may comprise SRAMs. In an exemplary embodiment, the basic SRAM cell may comprise separate read and write bit lines, corresponding to four write ports and four read ports (not shown) per 4-wide issue, for the instruction queue payload RAM 141.

An instruction entry (not shown) in the instruction queue payload RAM 141 may have a corresponding 2-bit counter in a 'Ready' counter module 171 for each instruction in the instruction queue payload RAM 141 indicating the number of available operands for the instruction entry. The counter in the Ready counter module 171 may be appropriately initialized for Single-operand and Ready-at-Issue operand, and may be decremented by one each time an instruction operand becomes available. When the corresponding counter in the Ready counter module 171 becomes zero, the associated instruction may be provided for execution Inputs to the Ready counter module 171 may be provided by one or more decoded dependent pointers in the mapping table 143, and may also be provided by the multiple wake-up table 145. A selection logic module 165 functions to provide to the instruction queue payload RAM 141 up to four instructions per cycle to issue to execution units. In an exemplary embodiment, the selection logic module 165 performs a selection function in one-half of a clock cycle, such that wakeup and selection of an instruction may be performed in the same clock cycle.

In the configuration shown, the mapping table 143 may comprise eight write ports 147 and four read address ports 149 for a four-way processor. The size of the mapping table 143 may be equal to the number of physical registers in the processor. The mapping table 143 may include a column of 2-bit status fields 151 with corresponding independent state-machines with eight parallel inputs corresponding to the eight write ports 147. The mapping table 143 may include a record for each particular instruction, corresponding to a given physical register, to identify dependent instructions stored therein.

The mapping table 143 may also include a C-pointer 153 for identifying a first dependent instruction for a particular instruction, and an M-pointer 155 pointing to an allocated entry in the multiple wake-up table 145 for identifying any additional dependent instructions for the particular instruction. The mapping table 143 may provide C-pointer 153 information to the Ready Counter Update logic via a first 5-bit decoder module 173. The mapping table 143 may further provide M-pointer 155 information to the multiple wake-up table 145 to supply additional dependent instruction pointers to the Ready Counter Update logic via the first 5-bit decoder module 173, so as to identify a queued instruction for wakeup.

In an exemplary embodiment where the mapping table 143 includes one dependent instruction pointer, a status field 151 value of '00' may indicate no dependent instruction, a status field 151 value of '01' may indicate one dependent instruction, a status field 151 value of '10' may indicate more than one dependent instruction, and a status field 151 value of '11' may indicate a completed instruction. In the configuration shown, at least six operations may be performed on the mapping table 143; entry allocation, update of the C-pointer 153, update of the M-pointer 1551 wakeup, branch mis-prediction recovery, and release.

In an exemplary embodiment, the multiple wake-up table 145 may comprise a memory of 'M' rows by 'E' columns, where E is the size of the instruction queue payload RAM 141 and M<<E. The multiple wake-up table 145 may further include eight 1-bit write ports and four E-bit read ports. An entry in the multiple wake-up table 145 may be used to record multiple dependent instructions of a single instruction, and may be pointed to by the field of the M-pointer 155 for the entry in the mapping table 143 corresponding to this single instruction. That is, the M-pointer 155 may point to a dependent instruction vector entry allocated in a the multiple wake-up table 145 for at least the second dependent instruction, where the instruction vector is large enough to describe all related dependent instructions.

An entry in the multiple wake-up table 145 may contain a cancelled dependent instruction. Accordingly, a corresponding 'Free' bit 179 in the instruction queue payload RAM 141 may be used to indicate which entries in the instruction queue payload RAM 141 may be valid at a particular clock cycle. The Free bit 179 may be ANDed into every entry in the multiple wake-up table 145 to invalidate any cancelled dependent instructions. If all dependent instructions in an entry of the multiple wake-up table 145 are cancelled, the corresponding entry may be freed. If an entry in the mapping table 143 changes status from 'multiple dependents' to 'single dependent,' the corresponding entry in the multiple wake-up table 145 may be freed accordingly.

In the configuration shown, four instructions may be entered into the instruction queue payload RAM 141 in each clock cycle. An allocation logic module 163 may select four free entries in the instruction queue payload RAM 141 and may accordingly allocate and write the incoming four instructions in the instruction queue payload RAM 141. During the same cycle, four entries may be allocated in the mapping table 143 using the instruction destination register numbers and an allocation module (not shown) in the mapping table 143. The status field 151 values for each of the four entries in the mapping table 143 may be initialized to '00.'

Each of the four instructions entered into the instruction queue payload RAM 141 may also have one or two source operands. These operands may be used to create and/or update information about the dependent instruction by using the source operand register number. Each entry in the mapping table 143 producing one of the eight possible source operands may be updated with this dependent information by using a mapping pointer update logic module 167. The location in the instruction queue payload RAM 141 of the first dependent instruction of a given destination register may be written into the field of the C-pointer 153. The M-pointer 155 points to an entry in the multiple wakeup table 145 that describes the second and subsequent dependent instructions. If dependent instructions in addition to the first dependent instruction are present, a corresponding entry may be allocated and recorded in the multiple wake-up table 145.

In an exemplary embodiment, the status field 151 value for each of the entries in the mapping table 143 may also be updated during the same clock cycle. An instruction with source operands in registers 'Reg11' and 'Reg23,' for example, may cause entries at corresponding locations 11 and 23 in the mapping table 143 to be updated. Eight decoders may thus be used, one decoder for each decoded source register tag input to the mapping pointer update logic module 167. The mapping pointer update logic module 167 may have eight selection lines per entry in the mapping table 143 and may include a parallel counter 177, with each selection line used as an input to the parallel counter 177. The parallel counter 177 may be used to detect the number of dependent instructions being added to an entry in a given clock cycle. The status field 151 value may also comprise another input to the mapping pointer update logic module 167.

When appropriately initialized, a counter in the Ready counter module 171 may be used to track the number of source operands that are not yet ready. The corresponding instruction in the instruction queue payload RAM 141 may be ready to execute when the value of the corresponding counter in the Ready counter module 171 becomes zero. At this point, the selection logic 165 may also function to check for the availability of resources that might be needed before an instruction can issue. For example, an instruction may have available the two operands needed to perform its function—multiplication, in this case—but the multiplier module (not shown) may be busy. Under such a circumstance, the selection logic 165 may then delay issuance of the instruction until the multiplier module became available.

A ready counter update logic 169 may be configured to detect up to two possible operands for each instruction becoming ready per cycle. These operands can be specified by either the field of the C-pointer 153 (for up to four operands per cycle) or entries in the multiple wake-up table 145 (for up to four times 32 operands per cycle). For instructions with a latency longer than one cycle, wakeup may be delayed until the instruction result is available by using a shift register (not shown) for each counter in the Ready counter module 171. In an exemplary embodiment, the ready counter update logic 169 may provide the shift registers. The shift register may be initialized by using the values supplied by the instruction queue payload RAM 141 when result-producing instructions are sent to execution. One-cycle latency may be treated as a special case to avoid shift register delay.

In an exemplary embodiment, the inputs to the ready counter update logic 169 for the Ready counter module 171 may include: (i) one bit from each of the four decoders for each of the C-pointers 153 read out, (ii) one bit from each of the four multiple wake-up table 145 entries read out, and (iii) the four latency values from the instruction queue payload RAM 141.

Figure 5:
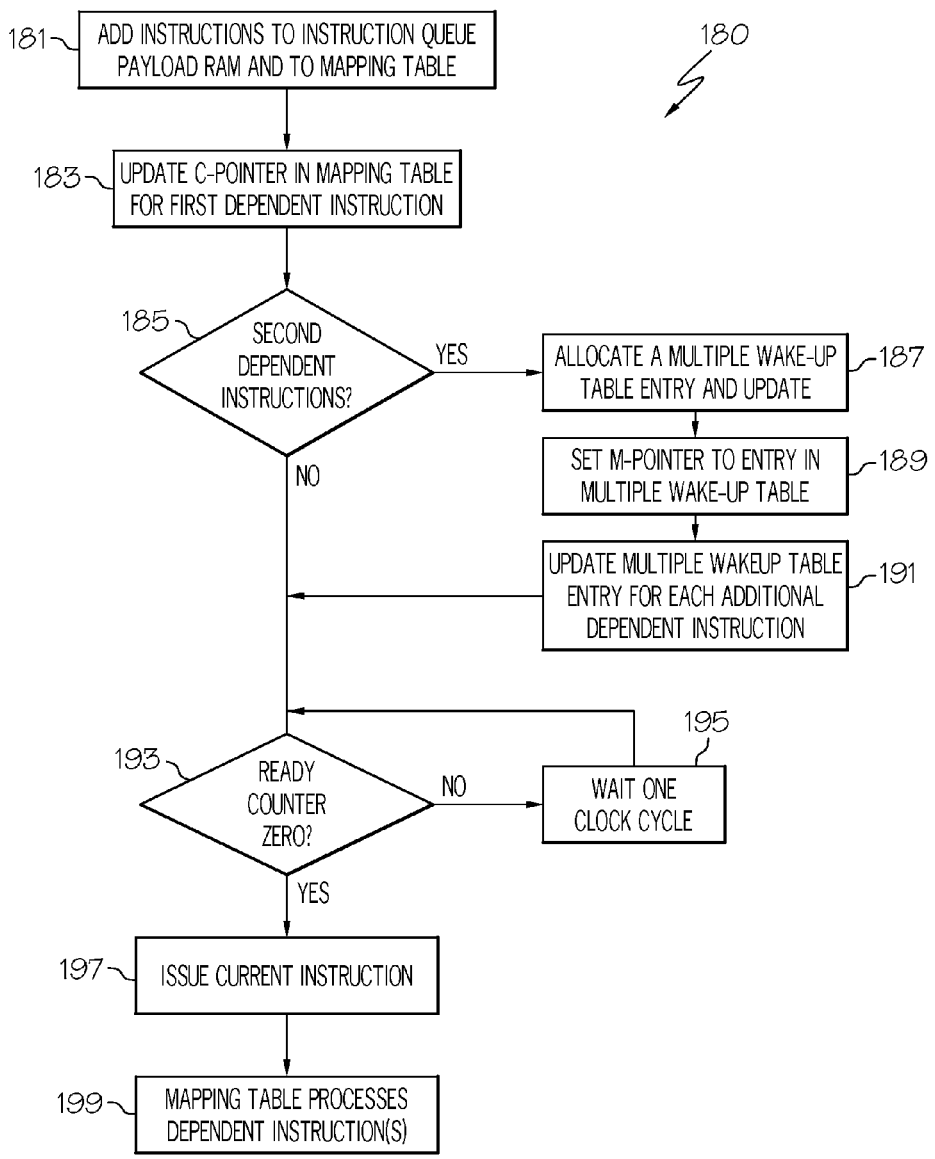
FIG. 5 is a flow diagram illustrating operation of the direct-wakeup pointer-based instruction queue organization of FIG. 4, in accordance with the present invention.
Figure 6:
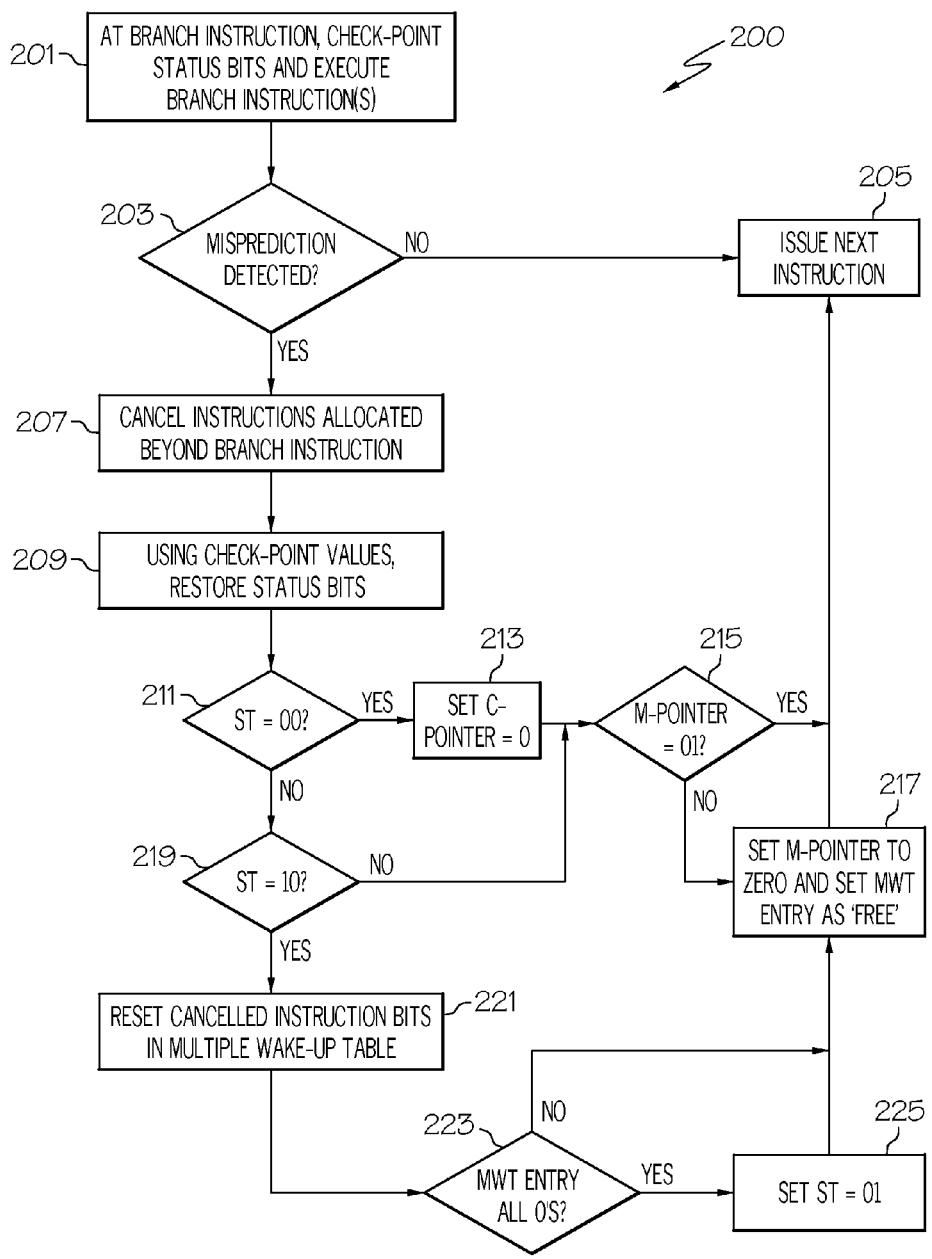
FIG. 6 is a flow diagram illustrating a method in which the direct-wakeup pointer-based instruction queue organization of FIG. 4 implements a mis-prediction recovery technique, in accordance with the present invention.

Operation of the direct-wakeup pointer-based instruction queue organization 140 can be described with additional reference to a flow diagram 180 in FIG. 5. The instruction 101 may be added to the instruction queue payload RAM 141 and the Mapping Table 143, at step 181. In the same clock cycle, or later, the corresponding entry in the mapping table 143 may be updated by setting the C-pointer 153 for the first dependent instruction, at step 183.

If more pointers are needed, because the current instruction is related to more than one dependent instruction, at decision block 185, an entry in the multiple wake-up table 145 may be allocated, at step 187, with the M-pointer 155 pointing to the entry, at step 189. The entry in the multiple wake-up table 145 may be updated for each additional dependent, at step 191, by setting bits for one or more such additional dependent instructions. Otherwise, a query is initiated, at decision block 193. It should be understood that instruction issue may stall if an entry in the multiple wake-up table 145 is needed but none are available. In an exemplary embodiment, the multiple wake-up table 145 may comprise up to eight entries for additional dependent instructions.

The corresponding counter in the Ready counter module 171 may be decremented, and the result may be available at the start of the next clock cycle. In an exemplary embodiment, latency counters comprising shift registers may be used to delay the Ready counter update if the selected instruction has a latency longer than one clock cycle. A counter in the Ready counter module 171 having a value of zero may indicate to the selection logic 165 that the current instruction may be ready for execution. Otherwise, if the value of the associated counter in the Ready counter module 171 is not zero, at decision block 193, the selection logic 165 may wait one or more clock cycles, looping with step 195, until the corresponding counter in the Ready counter module 171 is zero, and then the current instruction may be issued, at step 197.

The C-pointer 153 may be decoded and ORed with a corresponding entry in the multiple wake-up table 145, if there is a corresponding multiple entry present (e.g., a non-NULL M-pointer 155). The resulting bit for each position in the instruction queue payload RAM 141 may be input to the Ready counter module 171. When the current instruction is issued, at step 197, the destination register number of the selected instruction may be used to access the corresponding entry in the mapping table 143, and the associated dependent instructions may be processed by the mapping table 143, at step 199. The entry in the instruction queue payload RAM 141, the corresponding entry in the mapping table 143, and the corresponding entries (if any) in the multiple wake-up table 145 may be released when an instruction is sent to execution.

The action taken by the mapping pointer update logic module 167 in the mapping table 143 depends on the status field 151 value and the number of dependents being added in the current clock cycle. Case 1: If the status field 151 value is '00,' indicating zero dependent instructions, and the parallel counter 177 value is one, there may be a first dependent instruction to add. The status field 151 value may be set to '01' and the C-pointer 153 may be set to the address of the dependent instruction in the instruction queue payload RAM 141.

Case 2: If the status field 151 value is '01,' indicating one dependent instruction, and the parallel counter 177 value is greater than or equal to one, there may be at least a second dependent instruction to add. An entry may be allocated in the multiple wake-up table 145 and corresponding bits may be set in the multiple wake-up table 145 by a second 5-bit decoder module 175. Case 3: If the status field 151 value is '00,' indicating one dependent instruction, and the parallel counter 177 value is greater than one, there may be two or more dependent instructions to add. The C-pointer 153 may be set for an "earliest" dependent instruction. An entry may be allocated and initialized in the multiple wake-up table 145. Case 4: If the status field 151 value is '10,' indicating two or more dependent instructions, and the parallel counter 177 value is greater than or equal to one, the previous entry allocated in the multiple wake-up table 145 may be updated with additional dependent instructions.

As can be appreciated by one skilled in the art, the direct-wakeup pointer-based instruction queue organization 140 advantageously provides for branch mis-prediction recovery, or other types of mis-prediction recovery, because entries in the mapping table 143 are identified by the destination register of a corresponding instruction. In the branch mis-prediction recovery process, the status bits 151 may be check-pointed on each conditional branch to enable recovery of the dependent instruction information. However, one or more entries in the multiple wake-up table 145 may also need to be corrected if the recovered corresponding status bit 151 value is '00.' In addition, one or more entries in the multiple wake-up table 145 may also need to be corrected if the recovered corresponding status bit 151 value is either '1' or '10.'

As best shown in the flow chart 200 in FIG. 5, the processor may check-point all the status bits 151 of the mapping table 143 on a branch instruction, at step 201, and the branch instruction may be executed. If no mis-prediction is detected, at decision block 203, the next instruction may be issued, at step 205. If a branch mis-prediction is detected, at decision block 203, instructions allocated beyond the branch may be cancelled in the instruction queue payload RAM 141, at step 207. The action of canceling one or more dependent instructions may result in the C-pointer 153 and the M-pointer 155 having incorrect values for instructions before the branch. This action may also result in incorrect bits in entries in the multiple wake-up table 145.

The status bits 151 values of the mapping table 143 are restored from the check-pointed values, at step 209. If restored Status bits 151 values are found to be '00,' at decision block 211, then the corresponding C-pointer 153 is reset to zero, at step 213. If the M-pointer 155 is found valid, at decision block 215, the corresponding entry in the multiple wake-up table 145 may be freed, in step 217, and the M-pointer 155 may be reset to zero before the next instruction is issued, at step 205. If restored Status bits 151 are found to have a value other than '00,' at decision block 211, then an inquiry is made as to whether the restored Status bits 151 value is '10,' at decision block 219. If the restored Status bit 151 are found to be a value other than '10,' at decision block 219, then if the M-pointer 155 is found to be valid at decision block 215, the corresponding entry in the multiple wake-up table 145 may be freed, in step 217, the M-pointer 155 value may be reset, and the next instruction may be issued, at step 205.

If the restored Status bit 151 is found to be '10,' at decision block 219, then a bit corresponding to each cancelled instruction may be reset in each entry of the multiple wake-up table 145, at step 221. The free bit 179 of the instruction queue payload RAM 141 may be reset, that is, one bit may be set to '0' for each cancelled instruction entry in the instruction queue payload RAM 141. The NOT of the Free bit 179 values may be ANDed with corresponding entries in the multiple wake-up table 145. The entry in the multiple wake-up table 145 may be checked, at decision block 223. If the resulting entry in the multiple wake-up table 145 is all zeroes, then the status bit 151 values may be set to '01,' at step 225, the corresponding entry in the multiple wake-up table 145 may be set as 'Free,' at step 217, and the next instruction may be issued, at step 205.

If the processor in the direct-wakeup pointer-based instruction queue organization 140 performs branch mis-prediction recovery at the branch instruction commit time, the branch mis-prediction recovery process becomes simpler since the instruction queue payload RAM 141 is basically empty at this time. In such case, the C pointer 153 and the entries in the multiple wake-up table 145 can be freed and re-initialized. As can be appreciated by one skilled in the art, the disclosed check-pointing and mis-prediction recovery can be applied to any instruction. Other instructions that the processor may checkpoint include, for example value prediction, or may be applicable to computer architectures without a re-order buffer, such as Check-point Repair or Continual Flow pipeline.

In an alternative embodiment, a mis-prediction recovery technique comprises "walking" a reorder buffer and updating each entry as it is looked at. The walk can be from last instruction decoded to the mis-predicted branch or from the mis-predicted branch to the last decoded instruction. The walking process from the last instruction in the reorder buffer to the mis-predicted branch may include the following steps.

For each instruction being looked at; (1) If the instruction was executed, no further action is required; (2) If the instruction was not executed then, (a) the entry corresponding to the destination register of the instruction may be cleaned; (b) for each source operand register that was not produced by a cancelled instruction, the corresponding entry in the mapping table 143 may be accessed and the state of the Status bits 151 may be checked; (i) if the Status bits 151 value is '01,' then the value may be set to '00;' (ii) if the Status bits 151 value is '10,' then the multiple wake-up table 145 may be accessed and the corresponding bit may be reset; if the entry in the multiple wake-up table 145 becomes all zeros, the value of the Status bits 151 may be changed to '01' and the entry in the multiple wake-up table 145 may be set as free; and (iii) if the Status bits 151 value is '11,' no further action is required. The walking process from mis-predicted branch to the last instruction in the re-order buffer may include the same steps as above.

It should be understood, of course, that the foregoing relates to exemplary embodiments of the invention and that modifications may be made without departing from the spirit and scope of the invention as set forth in the following claims.

We claim:

1. A pointer-based instruction queue system for tracking dependent instructions for operand ready updates, the system comprising:
    an instruction queue payload RAM for storing instructions for execution by an out-of-order processor;
    a mapping table for storing information on dependent instructions dependent upon an instruction in said instruction queue payload RAM, said mapping table having a first pointer pointing to a first dependent instruction in said instruction queue payload RAM and a second pointer pointing to a multiple wakeup table entry with a second and any additional dependent instruction pointers, said second and said any additional dependent instruction pointers pointing to a corresponding second and to any corresponding additional dependent instructions in said instruction queue payload RAM; and
    a multiple wakeup table module for storing at least a pointer to said second dependent instruction in said instruction queue payload RAM, said second dependent instruction being dependent on one of said instructions stored in said instruction queue payload RAM.

2. The pointer-based instruction queue system of claim 1 wherein at least one entry in said multiple wake-up table describes at least one instruction in said instruction queue payload RAM.

3. The pointer-based instruction queue system of claim 1 wherein said mapping table comprises a status field indicating the number of dependent instructions in said instruction queue payload RAM waiting for a predefined result.

4. The pointer-based instruction queue system of claim 1 wherein, if said out-of-order processor operates with an issue width of N, said mapping table comprises N read ports and 2N write ports.

5. The pointer-based instruction queue system of claim 1 wherein, if E is the size of said instruction queue payload RAM, said multiple wake-up table comprises a memory of E columns.

6. The pointer-based instruction queue system of claim 1 wherein a said instruction allocated to said instruction queue payload RAM is identified by association with a physical destination register in said mapping table.

7. The pointer-based instruction queue system of claim 1 wherein said multiple wake-up table comprises a RAM to store a dependent instruction vector, said dependent instruction vector being allocated to an instruction having at least two dependent instructions.

8. The pointer-based instruction queue system of claim 1 further comprising a decoder module for providing pointer information from said mapping table to said instruction queue payload RAM.

9. A method for storing and identifying instructions ready for issuance in an out-of-order processor, said method comprising the steps of:
    adding a first instruction to an instruction queue payload RAM and to a mapping table;
    updating a first pointer in a mapping table entry for said first instruction in said mapping table, said first pointer pointing to a first dependent instruction entry in said instruction queue payload RAM, said first dependent instruction related to said first instruction;
    if a second dependent instruction is related to said first instruction, setting a second pointer in said mapping table, said second pointer pointing to a dependent instruction vector entry allocated in a multiple wake-up table for at least said second dependent instruction, said vector large enough to describe all related dependent instructions;
    indicating the number of operands necessary for the first instruction in a ready counter;
    decrementing the ready counter by one each time an instruction operand becomes available;
    selecting said first instruction for issuance if said ready counter in a ready counter update logic acquires a value of zero, where said ready counter value corresponds to said first instruction;
    processing said first dependent entry using said mapping table after completion of execution of the first instruction; and
    if said second pointer has been set to point to said dependent instruction vector entry in said multiple wake-up table, processing at least said second dependent instruction using said mapping table.

10. The method of claim 9 further comprising the step of delaying said first instruction from issuance until required resources for said first instruction becomes available.

11. The method of claim 9 further comprising the step of obtaining a check-pointed status bits value for status bits for said first instruction when said first instruction requires check-pointing, said status bits stored in said mapping table, said check-pointed status bits value obtained to provide for branch mis-prediction recovery.

12. The method of claim 9 further comprising:
    obtaining a check-pointed status bits value for said status bits for said first instruction at a branch instruction;
    detecting a branch mis-prediction in said first instruction;
    cancelling instructions allocated beyond said branch instruction and resetting corresponding free bits in said instruction queue payload RAM; and
    restoring said status bits by using said check-pointed status bits value.

13. The method of claim 12 wherein said step of restoring said status bits includes the step of resetting said first pointer in said wakeup table to indicate no dependent instructions, if said restored status bits indicate no dependent instructions.

14. The method of claim 12 wherein said second dependent instruction is related to said first instruction and said second dependent instruction has an entry in said multiple wake-up table.

15. The method of claim 14 wherein said mapping table comprises said second pointer for said second dependent instruction related to said first instruction.

16. The method of claim 15 wherein said step of restoring said status bits comprises the step of resetting said second pointer in said multiple wakeup table to indicate zero or one dependent instruction if said restored status bits indicate zero or one dependent instruction.

17. The method of claim 15 further comprising the steps of:
resetting said second pointer;
removing entries corresponding to cancelled dependent instructions in relevant multiple wakeup table entries by ANDing said relevant multiple wakeup table entries with free bits from said instruction queue payload RAM; and,
freeing one or more multiple wakeup table entries that no longer point to any instruction.

18. The method of claim 17 wherein said multiple wake-up table comprises RAM entries, each said RAM entry capable of storing at least one additional dependent instruction identifier related to said first instruction.

19. The method of claim 17 wherein said step of restoring said status bits comprises the step of freeing said multiple wakeup table entry if said restored status bits indicate zero or one dependent instruction.

* * * * *